United States Patent
Chu et al.

(10) Patent No.: US 7,548,910 B1
(45) Date of Patent: Jun. 16, 2009

(54) SYSTEM AND METHOD FOR RETRIEVING SCENARIO-SPECIFIC DOCUMENTS

(75) Inventors: Wesley W. Chu, Pacific Palisades, CA (US); Zhenyu Liu, Santa Monica, CA (US); Qinghua Zou, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 496 days.

(21) Appl. No.: 11/045,717

(22) Filed: Jan. 28, 2005

Related U.S. Application Data

(60) Provisional application No. 60/540,536, filed on Jan. 30, 2004.

(51) Int. Cl.
*G06F 17/03* (2006.01)
(52) U.S. Cl. .................. 707/4; 707/3; 707/5; 707/101; 715/212; 715/208
(58) Field of Classification Search ................. None
See application file for complete search history.

(56) References Cited

U.S. PATENT DOCUMENTS

| | | | |
|---|---|---|---|
| 5,617,119 A * | 4/1997 | Briggs et al. ................. | 707/100 |
| 6,289,353 B1 * | 9/2001 | Hazlehurst et al. .......... | 707/102 |
| 6,446,061 B1 * | 9/2002 | Doerre et al. ................. | 707/3 |
| 6,453,315 B1 * | 9/2002 | Weissman et al. ............ | 707/5 |
| 6,598,046 B1 * | 7/2003 | Goldberg et al. ............. | 707/5 |
| 6,772,139 B1 * | 8/2004 | Smith, III ..................... | 707/3 |
| 6,823,333 B2 * | 11/2004 | McGreevy .................... | 707/4 |
| 6,928,432 B2 * | 8/2005 | Fagan et al. .................. | 707/3 |
| 7,120,646 B2 * | 10/2006 | Streepy, Jr. .............. | 707/104.1 |
| 2005/0080776 A1 * | 4/2005 | Colledge et al. .............. | 707/3 |
| 2006/0031195 A1 | 2/2006 | Patterson | |
| 2006/0053142 A1 * | 3/2006 | Sebbane ..................... | 707/102 |

OTHER PUBLICATIONS

WO/2003/052627, information resource taxonomy, 4 pages.*
Mattew W. Billoti, Query Expantion Techniques For Question Answering, May 2004, Massachusetts Institute of Technology, 109 pages.*
Jouni Tuominen et al., Ontology-based Query Expansion Widget for Information Retrieval, Semantic Computing Research Group (SeCo), 5 pages.*
J.P. Callan, et al., The Inquery Retrieval System, In *Proceedings of DEXA '92*, 1992, (9 pgs).

(Continued)

*Primary Examiner*—John R. Cottingham
*Assistant Examiner*—Noosha Arjomandi
(74) *Attorney, Agent, or Firm*—Christie, Parker & Hale, LLP

(57) ABSTRACT

A system and method for automatically extracting relevant key concepts from a free-text document and indexing the document using the extracted key concepts. The indexing mechanism applies syntactic and semantic filters to filter out irrelevant terms. The remaining terms are deemed to be key concepts for the free-text document. An input search query is compared against the key concepts extracted for the free-text document for determining whether the document satisfies the query. Prior to applying the search query, additional scenario-specific terms are added to the search query in order to improve retrieval performance. The query expansion mechanism generates a list of candidate expansion concepts, filters the list of candidate expansion concepts based on a user-entered scenario concept, and expands the input query based on the candidate expansion concepts remaining after the filtering process.

22 Claims, 12 Drawing Sheets

OTHER PUBLICATIONS

J.B. Lovins, *Development of a Stemming Algorithm*, Electronic Systems Laboratory, Massachusetts Institute of Technology, Cambridge, Massachusetts, pp. 22-31, 1968.

R. Mandala et al., Combining Multiple Evidence from Different Types of Thesaurus for Query Expansion, In Proc. 22nd ACM-SIGIR, pp. 191-197, 1999.

W. Mao et al., Free-Text Medical Document Retrieval Via Phrase-Based Vector Space Model, in Proc. of AMIA Annual Symp 2002, 5 pgs.

*NLM Fact Sheets*, Fact Sheets Listed Alphabetically, www.nlm.nih.gov/pubs/factsheets, pp. 1-3, Jan. 2001.

*Unified Medical Language System*, UMLS Knowledge Sources, 15th edition, 9 pgs., http://www.nlm.nih.gov/research/umls/archive/2004AA/UMLSDOC.html, 2004.

Y. Qiu et al., Concept Based Query Expansion, In Proc. 16th ACM-SIGIR, pp. 1-11, 1993.

G. Salton, *A New Comparison Between Conventional Indexing (MEDLARS) and Automatic Text Processing (SMART)*, Department of Computer Science, Journal of the American Society for Information Science- Mar.-Apr. 1972, pp. 75-84.

M. Steinbach et al., A Comparison of Document Clustering Techniques, In Proc. of the KDD Work Shop on Text Mining, 2000, pp. 1-20.

S. Srinivasan, et al., Finding UMLS Metathesaurus Concepts in MEDLINE, In Proc. of AMIA Annual Symp 2002, 5 pgs.

Tuttle et al., *Metaphase: An Aid to the Clinical Conceptualization and Formalization of Patient Problems in Healthcare Enterprises*, Methods of Information in Medicine, pp. 373-383, 1998.

G. Salton et al., A Vector Space Model for Automatic Indexing, 18(11): 613-620, 1975, Association for Computing Machinery, Inc.

E. Voorhees, On Expanding Query Vectors with Lexically Related Words, In Proc. TREC-2, 9pgs., 1993.

J. Xu et al., Query Expansion Using Local Global Document Analysis, In Proc. 19th ACM-SIGIR, pp. 4-11, 1996.

Y. Zieman, et al., Conceptual Mapping of User's Queries to Medical Subject Headings, In Proc. of AMIA Annual Symp 1997, 5 pgs.

Q. Zou et al., *IndexFinder*: A Method of Extracting Key Concepts from Clinical Texts for Indexing, AMIA Annual Sypm 2003.

Aronson, Effective Mapping of Biomedical Text to the UMLS Metathesarurs; The MetaMap Program, National Library of Medicine, In Proc AMIA Symp 2001: pp. 17-21.

Brin et al., The Anatomy of a Large-Scale Hypertextual Web Search Engine, Computer Science Department, Stanford University, pp. 1-26, http://www7.scu.edu.au/programme/fullpapers/1921/com1921.htm, 1998.

Hsu et al., A Knowledge-Based Approach for Retrieving Images by Content, IEEE, Aug. 1996, pp. 1-5, http://csd12.computer.org/persagen/DLAbsToc.isp?resourcePath=dl/trans/....

Bui et al., An XML Gateway to Patient Data for Medical Research Applications, Abstract, 2 pgs, Dec. 2002, http://www.blackwell-synergy.com/doi/abs/10.1111/i.1749-6632.2002.tb049....

Zhao et al., Evaluation of Hierarchical Clustering Algorithms for Document Datasets, CIKMS'02, Nov. 4-9, 2002, pp. 515-524.

* cited by examiner

FIG. 3A

| PID | WORDS | # | CUI |
|---|---|---|---|
| 0 | A | 1 | C1 |
| 1 | B | 1 | C2 |
| 2 | C | 1 | C4 |
| 3 | A, B | 2 | C3 |
| 4 | A, C | 2 | C8 |
| 5 | E, D | 2 | C7 |
| 6 | B, C, D | 3 | C5 |
| 7 | A, D, E | 3 | C6 |

FIG. 3B

| WORD ==> WID |
|---|
| A ==> 0 |
| B ==> 1 |
| C ==> 2 |
| D ==> 3 |
| E ==> 4 |

FIG. 3C

| WID | PIDS |
|---|---|
| 0 | 0, 3, 4, 7 |
| 1 | 1, 3, 6 |
| 2 | 2, 4, 6 |
| 3 | 5, 6, 7 |
| 4 | 5, 7 |

FIG. 3D

| LEN | upPID |
|---|---|
| 0 | 0 |
| 1 | 3 |
| 2 | 6 |
| 3 | 8 |

FIG. 3E

| PID | CUI |
|---|---|
| 0 | C1 |
| 1 | C2 |
| 2 | C4 |
| 3 | C3 |
| 4 | C8 |
| 5 | C7 |
| 6 | C5 |
| 7 | C6 |

| PID | INSERTED |
|---|---|
| QUEUE → | WORDS |
| 0 → | {A} |
| 1 → | {B} |
| 2 → | {C} |
| 3 → | {A, B} |
| 4 → | {A, C} |
| 5 → | {D} |
| 6 → | {B, C, D} |
| 7 → | {A, D} |

FIG. 5A

| WORD: | WID: | PIDS |
|---|---|---|
| A: | 0: | 0, 3, 4, 7 |
| B: | 1: | 1, 3, 6 |
| C: | 2: | 2, 4, 6 |
| D: | 3: | 5, 6, 7 |

FIG. 5B

| WORD → BID |
|---|
| CHILDREN → 0 |
| WOMEN → 1 |
| MEN → 2 |
| BROUGHT → 3 |
| AROSE → 4 |
| ARISEN → 4 |

| BID | BASE |
|---|---|
| 0 | CHILD |
| 1 | WOMAN |
| 2 | MAN |
| 3 | BRING |
| 4 | ARISE |

Filter Options

| | |
|---|---|
| Symbol Type | ☑ Digits  ☑ DLetters  ☑ LDigits  ☑ Abbr  ☑ Word  ☑ Other |
| Term Length | ○ Less than 6    ○ Less than 11    ⊙ Any |
| Occurrence | ○ At least 1    ○ Majority    ⊙ All |
| Combination | ☑ Remove subsets |
| Range | ☐ Range filter, within [10] words. |
| Semantic | +T047-----Disease or Syndrome<br>+T048------Mental or Behavioral Dysfunction<br>+T191------Neoplastic Process<br><br>-T045------Genetic Function<br>-T046----Pathologic Function<br>+T047-----Disease or Syndrome<br>+T048------Mental or Behavioral Dysfunction<br>+T191------Neoplastic Process |

[Update Selection] | Load predefined filters [Disease and Finding]

Labels: 800, 802, 804, 806, 808, 810

FIG. 8

SYSTEM AND METHOD FOR RETRIEVING SCENARIO-SPECIFIC DOCUMENTS

CROSS-REFERENCE TO RELATED APPLICATION(S)

This application claims the benefit of U.S. Provisional Application No. 60/540,536, filed on Jan. 30, 2004, the content of which is incorporated herein by reference.

STATEMENT REGARDING FEDERALLY SPONSORED RESEARCH/DEVELOPMENT

This invention was made with Government support under Grant No. EB00216, awarded by the National Institutes of Health (NIH). The Government has certain rights in this invention.

BACKGROUND OF THE INVENTION

Recent years have witnessed a phenomenal growth of digitally stored medical information and clinical data which different groups of people may want to access. Healthcare professionals may want to access the information during the process of healthcare planning, decision, and delivery. Patients and other non-healthcare professionals may want to access the information to enrich their knowledge, or to obtain insight on a particular medical condition, its cause and/or treatment.

Assume, for example, a typical clinical environment where a physician tries to find diagnosis or therapy options for a patient's disease based on the patient's past clinical reports and major complaints. In order to efficiently locate the most relevant medical literature, the physician manually forms a short query made up of one or more keywords and submits the query to an information retrieval system. In order for the search to be productive, however, the physician must carefully select the keywords to best summarize the patient's past history and symptoms, and clearly define the physician's specific information needs, e.g. regarding "diagnosis," "treatment"

Traditional information retrieval systems are inadequate for handling scenario-specific searches as the one described above. This is because such systems often suffer from the fundamental problem of query-document mismatch. The scenario terms in the scenario-specific queries are often general, e.g. "treatment" in the query "lung cancer treatment," while full-text medical documents often discuss the same topic using much more specialized terms, e.g., "lung excision" or "chemotherapy." Such general scenario terms fail to match with the specialized terms in relevant documents, resulting in poor retrieval performance. Because of such ineffectiveness, searching online document collections for clinical usage is often frustrating, labor-intensive, and time-consuming.

Accordingly, what is desired is a more efficient and effective system and method for retrieving scenario-specific information.

SUMMARY OF THE INVENTION

The present invention is directed to a system and method for automatically indexing free-text documents into relevant key concepts, and expanding queries to more scenario-specific queries in order to improve retrieval performance. According to one embodiment, a concept includes a word or word phrase having a specific meaning in a particular application domain, such as, for example, a medical domain.

According to one embodiment of the invention, the present invention is directed to a computer system for identifying a free-text document satisfying an input query having a query term and a scenario identifier. The system includes an input receiving the input query with the original query term and the scenario identifier. The system also includes a processor that is operable to execute computer instructions which automatically generate an expanded query having one or more additional query terms selected in response to a determination that the additional query terms are associated with the scenario identifier. The computer instructions also automatically generate index terms for the free-text document. This includes generating a list of candidate index terms and filtering out one or more of the candidate index terms based on a user-defined filter criteria. The expanded input query is compared with the index terms for the free-text document, and information on the free-text document returned based on the comparison.

According to another embodiment, the present invention is directed to a query expansion method that includes receiving, under control of a computer, an input query having an original query term and a scenario identifier; generating, under control of the computer, a list of candidate query expansion terms based on the original query term; filtering, under control of the computer, the list of candidate expansion terms based on the scenario identifier; and expanding, under control of the computer, the input query based on remaining candidate expansion terms.

According to a further embodiment, the present invention is directed to a method for indexing free-text input where the method includes receiving the free-text input; permuting a set of words in the free-text input; generating a list of index terms from the permuted set of words; filtering the list of index terms based on a user-defined filter criteria; and returning the filtered list of index terms.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIGS. 3A-3E are conceptual diagrams of indexing data structures used by the indexing module for FIG. 2 for indexing free text according to one embodiment of the invention;

FIGS. 5A-5B exemplify the process of FIG. 4 for an exemplary input text based on the data structures of FIGS. 3A-3E;

FIGS. 6A-6B are exemplary data structures for word normalization according to one embodiment of the invention;

FIG. 8 is a screen shot of an exemplary user interface for setting filters to be used by an indexing module according to one embodiment of the invention;

DETAILED DESCRIPTION

Figure 1:
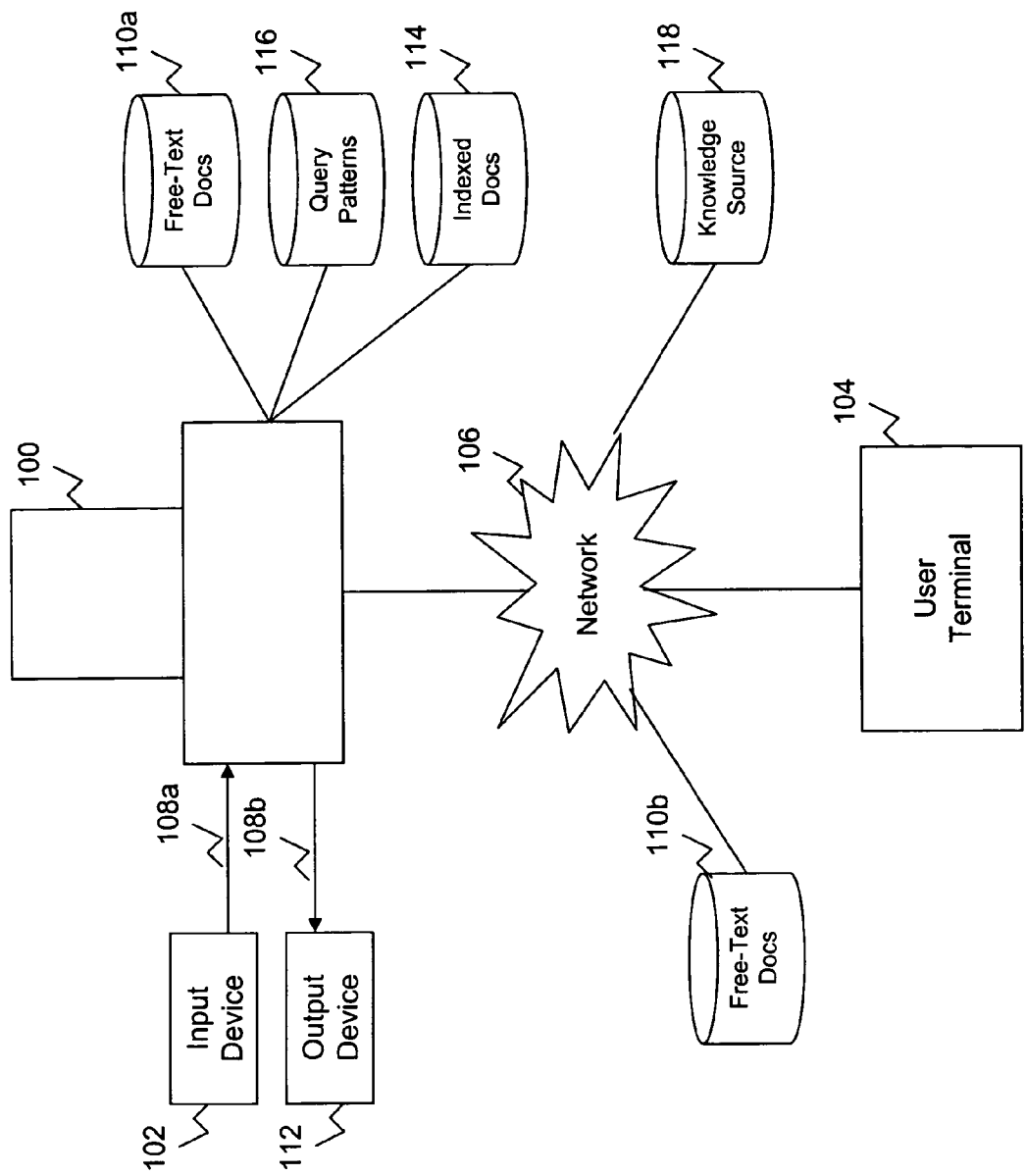
FIG. 1 is a block diagram of a system configured to implement scenario-specific searches of free-text documents according to one embodiment of the invention.

Medical free-text queries often share the same scenario. A scenario represents a reoccurring type of information need where the specific contextual information changes. Example scenarios are frequently-appearing medical tasks, such as, for example, diagnosis, treatment, etiology, and the like. Although the various embodiments of the present invention are described with respect to medical scenarios for retrieving medical free-text documents relevant to such medical scenarios, a person of skill in the art should recognize that the various embodiments of the present invention may also extend to non-medical scenarios and texts.

According to the various embodiments of the present invention, a system and method is provided for automatically extracting relevant key terms from a free-text document and comparing the extracted key terms to search terms in an input query for a match. The input query is expanded with additional scenario-specific terms in order to improve retrieval performance.

Indexing of free-text documents is important in order to quickly determine whether the document is a document that satisfies an input query. However, automatic indexing of free-text is generally a challenge. This is because documents are not written using a controlled vocabulary, but instead, different terms, phrases, and concepts may be used to convey the same type of information. Furthermore, unlike medical literature, where the author(s) identifies the key words that may be used for indexing purposes, such indexing information is not provided for many free-text documents.

Current technology for automatically identifying key terms for indexing free-text documents include natural language processing (NLP) techniques. NLP is used to parse passages of the free-text to generate noun phrases, which are in turn mapped into a controlled phrase. Although the NLP approach achieves some success, some key concepts may not be discovered through the identification of individual noun phrases. Furthermore, noun phrase identification and NLP require significant computing resources. As a result, most of the NLP systems work in an offline mode and thus are not suitable for mapping large volumes of free-text into key terms in real time.

The indexing mechanism according to the various embodiments of the present invention seeks to detect concepts from a given free-text by permuting the words in the text and identifying the terms that appear in a controlled vocabulary maintained by a knowledge source. Syntactic and semantic filters are then applied to filter out any irrelevant terms. The remaining terms are deemed to be key concepts which may then be used to index free-text documents, formulate scenario-specific queries for content correlation, and transform ad hoc query terms to terms that are defined by the knowledge source, all of which helps increase retrieval effectiveness.

The query expansion mechanism according to the various embodiments of the present invention appends to an original query additional terms that are specifically relevant to the query's scenario. Thus, instead of having a user to manually enter all relevant terms into the query, the query expansion mechanism automatically determines which terms are relevant based on the original query, and appends those terms to improve the retrieval of documents. Unlike prior art query expansion mechanisms, the query expansion mechanism according to the various embodiments makes use of the existing knowledge source to restrict query expansion to just the scenario-specific expansion terms.

FIG. 1 is a block diagram of a system configured to implement scenario-specific searches of free-text documents according to one embodiment of the invention. The system includes a computer 100 coupled to an input device 102, an output device 112, and a user terminal 104. The computer receives search queries or indexing commands from the input device 102 over a wired or wireless connection 108a, or from the user terminal 104 over a data communications network 106. The data communications network 106 may be a local area network, a private wide area network, a public wide area network like the Internet, or the like, implemented using one or more of a variety of wired or wireless solutions.

The computer 100 processes search queries to identify free-text documents stored in one or more document databases 110a, 110b (collectively referred to as 110) that satisfy the query. Information on the identified free-text documents are returned to the output device 112 over the wired or wireless connection 108b, or to the requesting user terminal 104 over the data communications network 106.

The computer 100 also generates indexing information for free-text documents in the documents database 110 in response to the indexing commands. Exemplary free-text documents include patient reports, medical literature, teaching files, and news articles. The generated indexing information is stored in an index database 114. The indexing information may also be returned to the output device 112 or the user terminal 104. Once indexed, a determination may be efficiently made as to whether a free-text document satisfies an input query by simply comparing the indexing information to the input query.

The computer 100 is further coupled to a query database 116 and a knowledge source 118. The query database 116 stores one or more query templates generated based on patterns identified from previous queries. Such query templates may be used for further expanding an original query and improving retrieval of relevant documents.

The knowledge source 118 provides syntactic, semantic, and classification information which may be used to index and search the free-text documents in the document databases 110a, 110b. According to one embodiment of the invention, the knowledge source includes a data store storing concepts that are identified by concept unique identifier. According to one embodiment of the invention, a concept is a word or a word phrase that has a concrete meaning in a particular application domain, such as, for example, a medical domain. A concept is also referred to as a phrase or term.

According to one embodiment of the invention, the knowledge source 118 encodes different types of relationships between the concepts. The concepts may be classified into general categories, also referred to as semantic types. An exemplary knowledge source is a unified medical language system (UMLS) knowledge source developed by the U.S. National Library of Medicine. A person of art will recognize, however, that other knowledge sources may also be used in addition or in lieu of the UMLS knowledge source.

Figure 2:
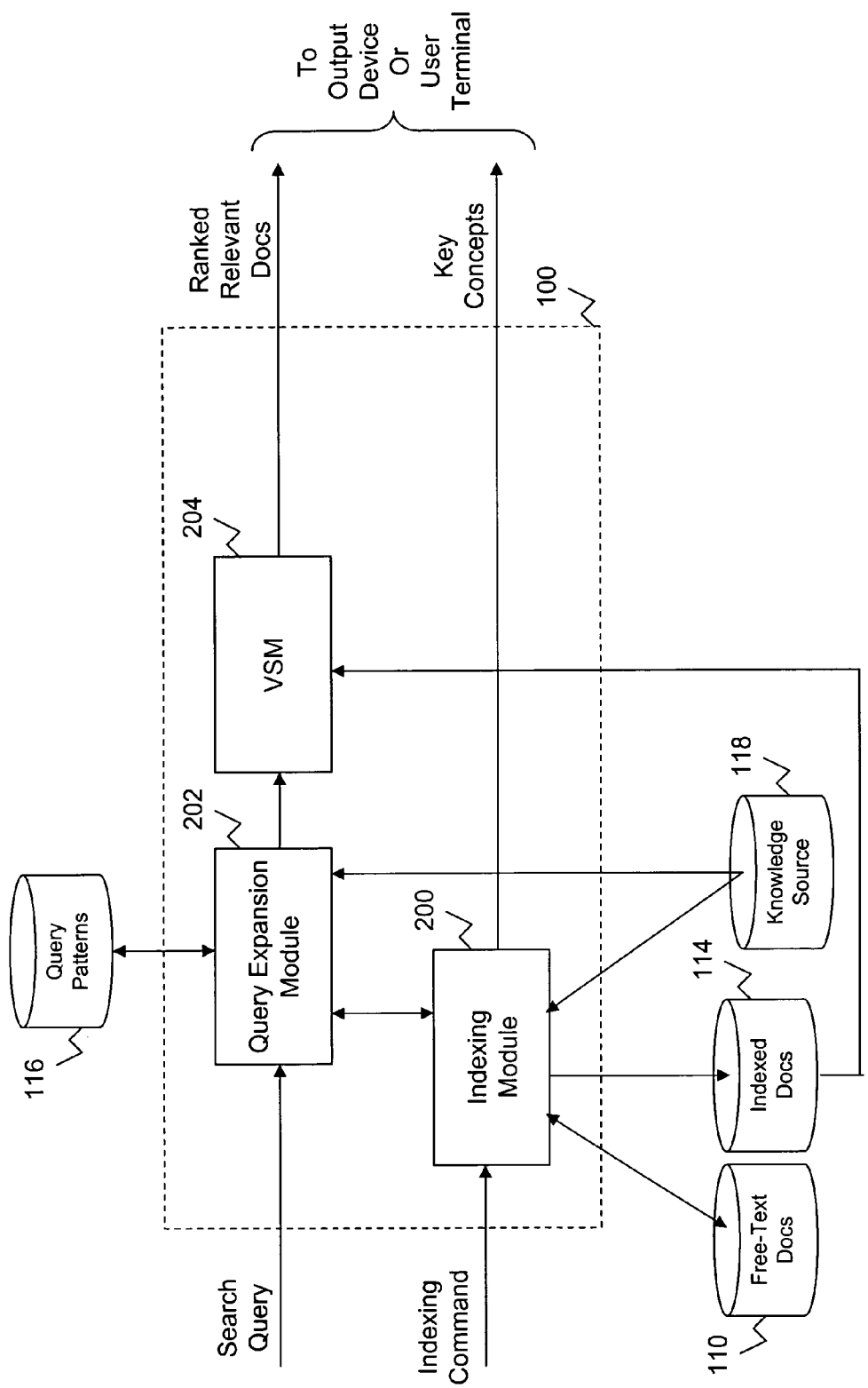
FIG. 2 is detailed block diagram of the computer in the system of FIG. 1 including an indexing module, a query expansion module, and a vector space model module.

FIG. 2 is detailed block diagram of the computer 100 according to one embodiment of the invention. The computer includes an indexing module 200, a query expansion module 202, and a vector space model (VSM) module 204. The various modules 200-204 may be implemented as software programs executed by one or more processors (not shown) included in the computer upon loading of associated computer instructions into the computer's main memory (not shown). One or more modules, such as, for example, the indexing module 202, may also reside one or more different computers in communication with the computer 100.

In general terms, the computer 100 receives free-text search queries from the input device 102 or user terminal 104. The computer 100 may provide a user interface, such as, for example, a web-based interface, to allow the user to manually enter free-text search terms into a search field provided by the user interface as part of the input query. Alternatively, instead of manually entering search terms, the user may select a free-text document such as, for example, a patient report that is to be used as part of the input query.

In addition to entering free-text search terms or document, the use also specifies a scenario to which the search relates. According to one embodiment of the invention, the user is provided with a predetermined list of scenarios from which he or she may choose. Exemplary scenarios for searching medical documents include, but are not limited to, treatment, diagnosis, prevention, cause, indication, risk factors, prognosis, research, complications, criteria, and preventative health care. According to one embodiment of the invention, the user-selectable scenarios are mapped to semantic relationship links maintained by the knowledge source 118 which indicate relationships between different semantic types.

According to one embodiment of the invention, query templates stored in the query database 116 define the structure of queries to be provided by the user. Each query template includes a key concept portion and one or more predefined scenario concepts. The key concept portion may be specified via a particular semantic type, such as, for example "Disease and syndrome." Below is a list of exemplary query templates that the user may use to formulate specific queries:

$T_1$: <Disease and syndrome>, treatment $T_2$: <Disease and syndrome>, diagnosis $T_3$: <Disease and syndrome>, treatment and diagnosis The above templates may be provided via the user interface as a drop down menu. The user may select an appropriate template and fill out a concrete key concept, such as, for example, "lung cancer" into template $T_1$, to generate a specific input query, such as, for example, "lung cancer, treatment."

An input search query is forwarded to the query expansion module 202. The query expansion module identifies additional terms that are specifically relevant to the query's scenario using the terms in the input query, original scenario concept(s), and information provided by the knowledge source 118. The additional terms are appended to the original query to generate an expanded query.

The expanded query is forwarded to the VSM module 204. The VSM module compares the index terms of one or more indexed documents in the documents database 110 to the expanded query terms for a match. In this regard, the VSM module 204 encodes the expanded query into a vector of query terms and generates a query vector. The VSM module 204 further encodes an indexed free-text document into a vector of index terms and generates a document vector. The VSM then performs a dot matrix calculation based on the query vector and the document vector for determining their similarity, and outputs a predetermined number of documents that are calculated to be most similar.

According to one embodiment of the invention, the indexing module 200 indexes a document stored in the document database 110 in response to an indexing command provided via a user interface, such as, for example, a web-based interface. An input query may also be processed by the indexing module 200 to extract key terms and eliminate irrelevant terms from the query. This may be desirable, for example, if the input query is a free-text document or some other type of ad hoc query.

In indexing an input free text, the indexing module 200 generates a list of candidate concepts that are potential candidates for being used as the indexing terms for the document. In order to generate the candidate concepts, the indexing module 200 maps various permutations of words in the free-text to concepts in the knowledge source. Such a mapping may be naively accomplished by taking each permutation and determining whether the permutation is a phrase in the knowledge source. Another naive approach would be to take each phrase in the knowledge source and determine whether the phrase is a subset in the text. According to one embodiment of the invention, the indexing module departs from both of these naive approaches and instead, boils the mapping problem down to a simple counting process which is computationally more efficient than the above-mentioned approaches.

FIGS. 3A-3E are conceptual diagrams of indexing data structures which allow the efficient mapping of phrases in the input free-text to concepts in the knowledge source according to one embodiment of the invention. Because the data structures may be maintained in the main memory of the computer 100, disk access may be avoided in performing the mapping function.

A phrase table 300 includes a list of concepts that are maintained by the knowledge source 118. The phrase table includes a phrase identifier (PID) 300a identifying the particular phrase, a set of words 300b making up the phrase, a number of words 300c in the phrase, and a unique concept identifier (CUI) associated with the phrase. According to one embodiment of the invention, the phrase table is sorted according to an increasing number of words.

A word hash table 302 maps a word in the phrase table to a unique word identifier (WID). A word-to-PID table 304 maps a WID to a list of phrase identifier PIDs. The word-to-PID table 304 is therefore an inverted index indicating the phrase list where a word occurs. A CUI table 306 maps a PID to a CUI. A phrase length table 308 indicates an upper bond for a given phrase length. Because all the illustrated data structures may be maintained in the main memory of the computer 100, disk access may be avoided in performing the mapping function.

Figure 4:
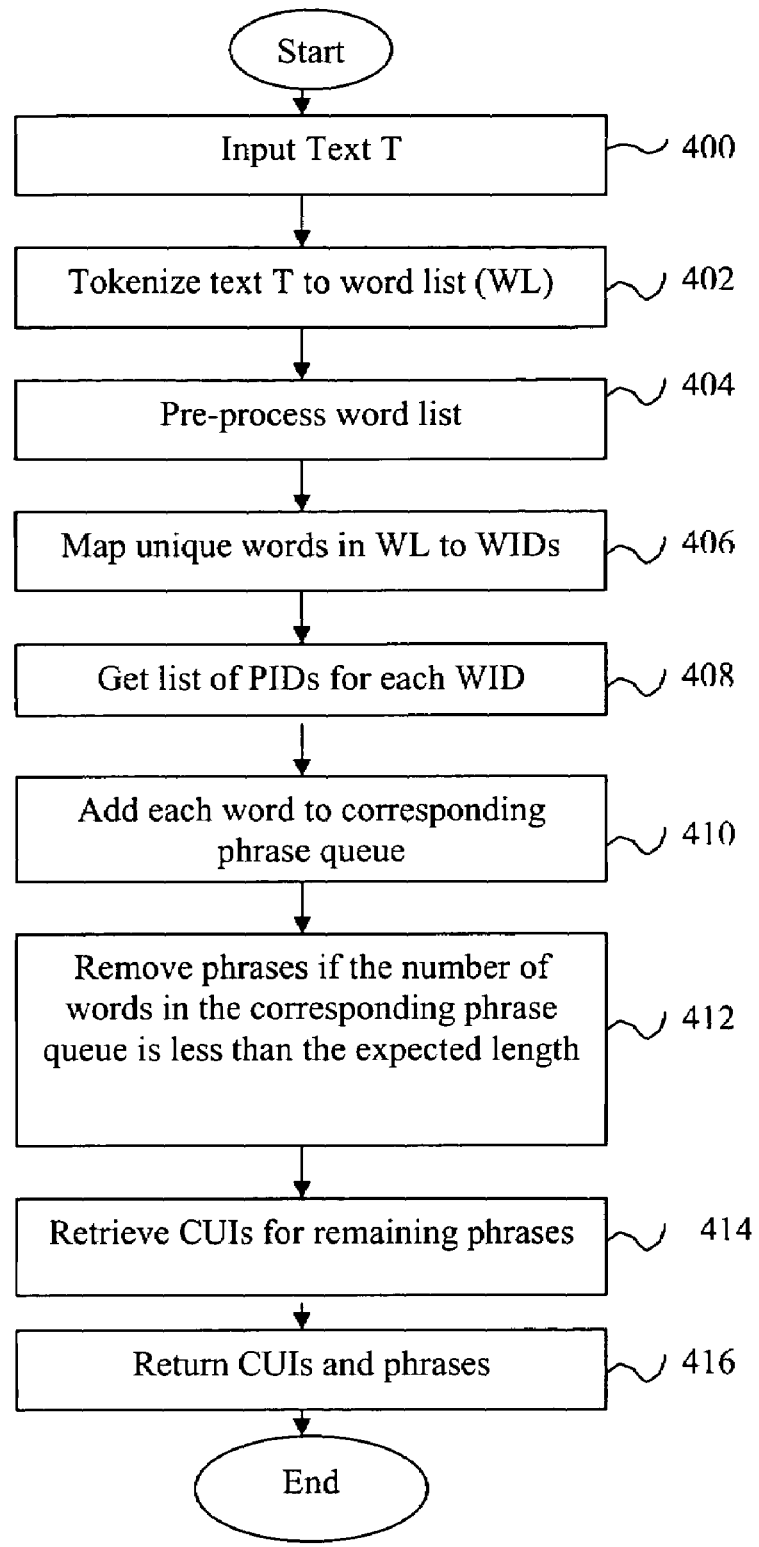
FIG. 4 is a flow diagram of a process implemented by the indexing module for mapping various permutations of words in an input free-text to predefined concepts according to one embodiment of the invention.

FIG. 4 is a flow diagram of a process implemented by the indexing module 200 for mapping various permutations of words in an input free-text to predefined concepts according to one embodiment of the invention. In step 400, the indexing module 200 receives an input text. In step 402, the indexing module tokenizes the text into a list of words.

In step 404, the indexing module preprocesses the word list by, for example, dropping the repeating words in the word list and normalizing the remaining words. According to one embodiment of the invention, the normalization process includes removing regular word inflections from the word. For example, the suffix "s" is removed from the word "kidneys" to transform it into "kidney."

If, however, the word does not contain a regular word inflection, the normalization process makes use of a hash table 600 (FIG. 6A) and base table 602 (FIG. 6B) for determining whether the word has a special inflection. Words with special inflections are contained in a hash table 600. Upon location of the word in the hash table 600, a base identifier for the word is retrieved for obtaining the base word from the base table 602. The word in the word list is then replaced with the base word.

In step 406, the indexing module maps the unique words in the word list to WIDS using the word hash table 302. In step 408, the word-to-PID table 304 is invoked to retrieve the PIDs for each WID.

In step 410, each word is added to a corresponding phrase queue. After all the words have been inserted, the length of each phrase in the phrase queue is considered for determining whether it is of the length indicated in the phrase length table 308. If the length of the phrase is shorter than the expected length, than an assumption may be made that the phrase is missing one or more words, and the phrase is thus removed in step 412.

In step 414, the indexing module retrieves the CUIs for the remaining phrases using the CUI table 306. In step 416, the retrieved CUIs and associated phrases are then returned in step 416.

FIGS. 5A-5B exemplify the process of FIG. 4 for an input text T={A, B, C, D} based on the data structures of FIGS. 3A-3E. FIG. 5B illustrates each word in the input text mapped into its WID and corresponding PIDs. For example, word "A," has a WID of "0," and PIDS {0,3,4,7} indicating hat "A" occurs in four phrases. The word "A" is thus added to the phrase queue corresponding to the identified PIDs. FIG. 5A illustrates the contents of each phrase queue after processing all the words in T. According to the phrase length table 308, PIDs 5 and 7 are expected to have a length of 2 and 3, respectively. However, as illustrated in FIG. 5A, the phrase queues associated with PIDs 5 and 7 have lengths of 1 and 2, respectively. This, therefore, indicates that not all the words of phrases having PIDs 5 and 7 in the phrase table 300 are present in the phrase queue. Accordingly, PIDs 5 and 7 are removed from the output results.

Figure 7B:
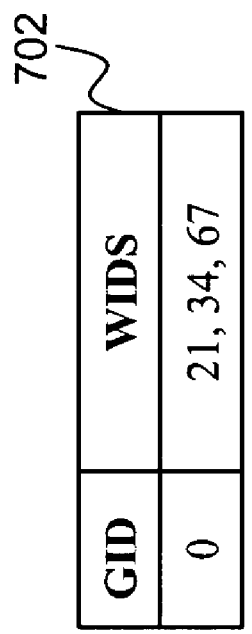
FIGS. 7A-7B are exemplary data structures for finding a word synonym according to one embodiment of the invention.
Figure 7A:
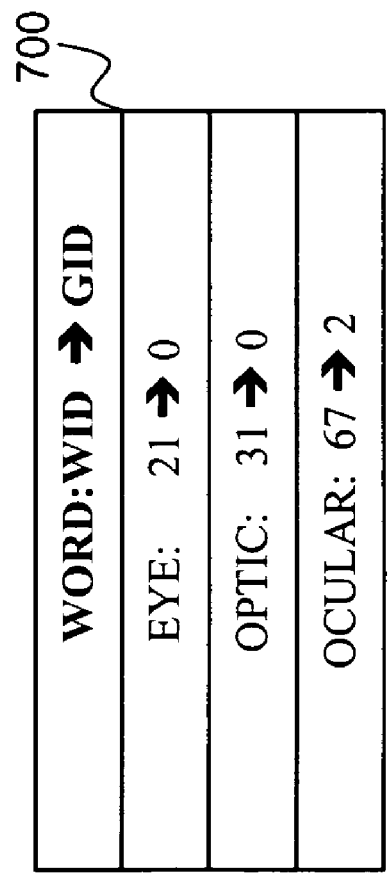

According to one embodiment of the invention, the indexing module considers the synonyms of an input text when generating the list of candidate concepts. This is useful for retrieving the appropriate concepts even if the exact term used in the concept did not appear in the text, but rather, a recognized synonym. A synonym hash table 700 such as the one illustrated in FIG. 7A may be used for detecting synonyms. The synonym hash table maps a word to a synonym group. For example, the words eye, optic, and ocular are synonyms of each other, and are thus given a same group identifier 700a such as, for example, group identifier "0." Table 702 then maps the synonym group to its member words.

After generating the list of candidate concepts for indexing the free text, the indexing module applies filters that use syntactic or semantic information from the original input text and the knowledge source 118 to filter out irrelevant concepts. The filters may be set by a user via a user interface such as the user interface illustrated in FIG. 8.

According to one embodiment of the invention, the indexing module provides six types of filters that may be set for filtering out irrelevant concepts. A symbol type filter 800 specifies the types of symbols that are to be contained in the candidate phrases. For example, the user may indicate that the phrases may include numbers and/or letters. A term length filter 802 specifies the length limitation of the candidate phrases. A coverage filter 804 specifies the coverage condition for a candidate phrase as being "at least one," "majority," and "all." If "all" is selected, every word in a candidate phrase is to be present in the input text.

A subset filter 806 removes phrases if they are subsets of some other phrases. For example, if the returned phrases are {lung cancer} and {cancer}, {cancer} is removed in response to the setting of the subset filter.

A range filter 808 removes a phrase if the phrase is made up of words that exceed a specific distance from each other. For example, the ranger filter 808 may be set to indicate that the words making up the phrase are to be contained in a single sentence of the input text.

A semantic filter 810 allows the user to remove phrases of undesired semantic types. According to one embodiment of the invention, the semantic types available via the semantic filter are all or a portion of the semantic types provided by the knowledge source 118. Exemplary semantic types include diseases, findings, drugs, medical procedures, and body parts For example the user may select the "disease" semantic type to select concepts that have been categorized to be within the selected semantic type.

The key concepts for an input free text returned by the indexing module 200 are provided to the query expansion module 202. The query expansion module 202 automatically expands scenario concepts $c_s$ for a given key concept $c_k$, based on the semantic structure provided by the knowledge source 118. According to one embodiment of the invention, the knowledge source 118 abstracts a group of concepts in its controlled vocabulary into one or more semantic types or categories.

Figure 9:
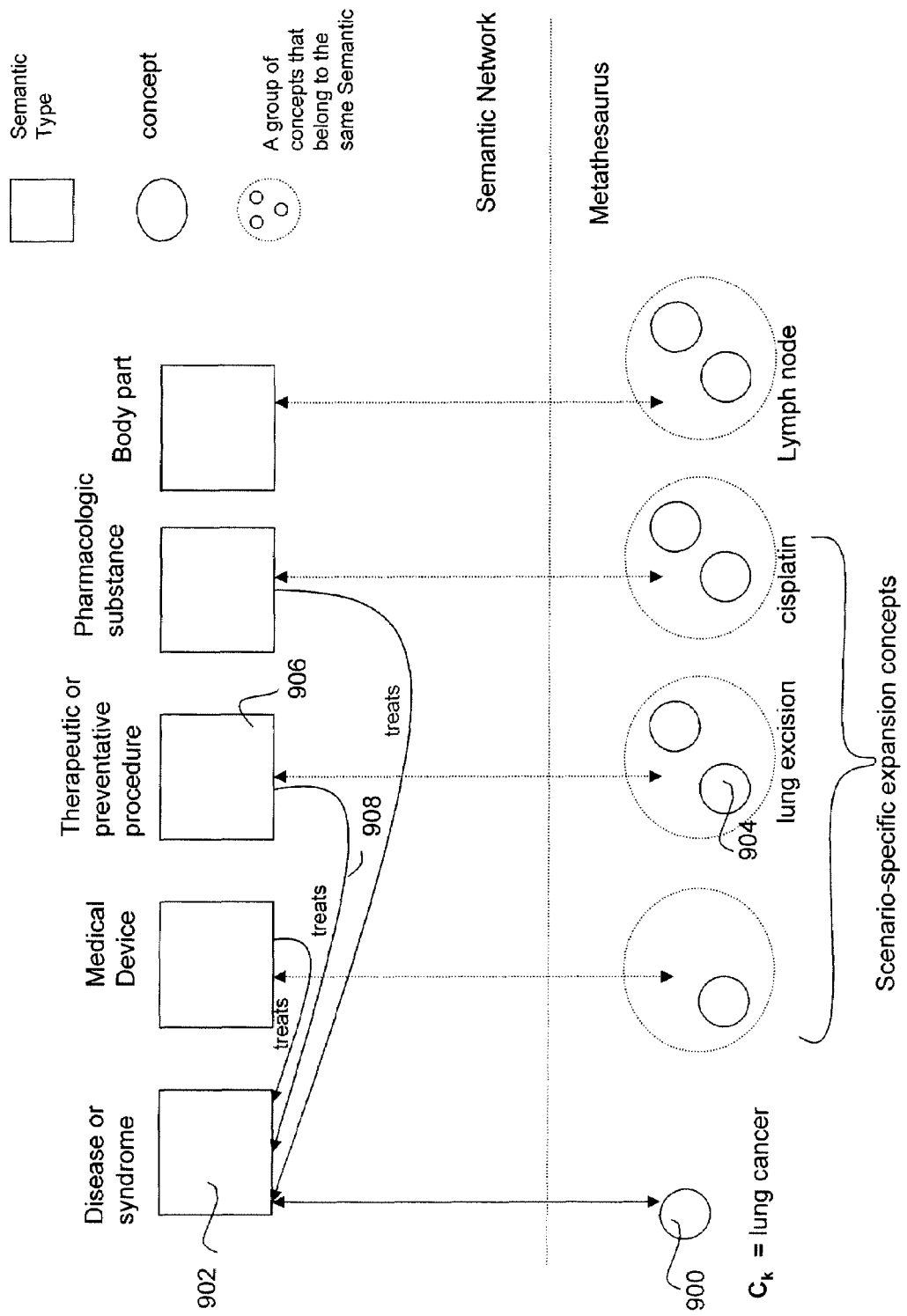
FIG. 9 is a conceptual diagram of an abstraction of concepts into semantic types according to one embodiment of the invention.

FIG. 9 is a conceptual diagram of an abstraction of concepts into semantic types according to one embodiment of the invention. For example, a "lung cancer" concept 900 belongs to a "disease or syndrome" semantic type 902, and a "lung excision" concept belongs to a "therapeutic or preventive procedure" semantic type 906. The two semantic types 902, 906 are linked via a "treats" link 908. Accordingly, although the knowledge source 118 does not indicate that "lung excision" "treats" "lung cancer," it does indicate that "lung excision" belongs to "therapeutic or preventive procedure" which "treats" "disease or syndrome," which in turn is the semantic type for "lung cancer." This knowledge structure aids the query expansion module 202 to automatically expand the original query with scenario-specific concepts.

Figure 10:
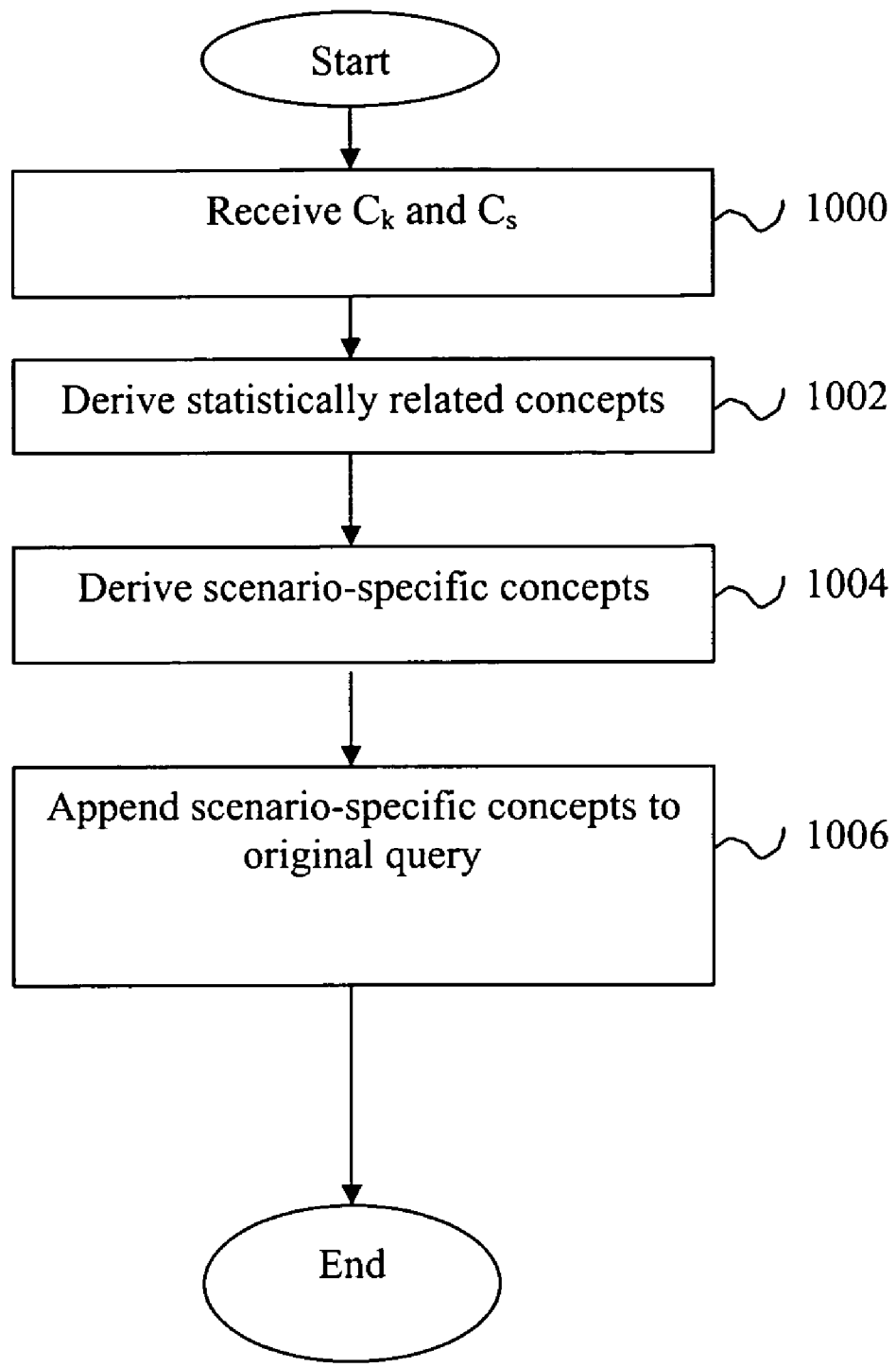
FIG. 10 is a flow diagram of a process executed by a query expansion module for adding scenario specific query terms to an original query according to one embodiment of the invention.

FIG. 10 is a flow diagram of a process executed by the query expansion module 202 for adding scenario specific query terms to an original query according to one embodiment of the invention.

In step 1000, the query expansion module 202 receives a key concept $c_k$ from the indexing module 200 along with a scenario concept $c_s$. In step 1002, the query expansion module 202 obtains candidate concepts that are statistically related to the key concept. Any one of various well-known statistical expansion concept mechanisms may be utilized during this step such as, for example, expansion mechanisms using a concept co-occurrence thesaurus or pseudo relevance feedback. Using any of these expansion mechanisms for $c_k$="lung cancer" returns concepts such as "smoking," "lung excision," and the like. The returned concepts are deemed to be candidate expansion concepts.

In step 1004, the query expansion module 202 derives scenario-specific concepts by exploring the knowledge source 118 and identifying possible relationships between each candidate expansion concept and $c_k$. Such an exploration may indicate that "smoking" is a "risk factor" for "lung cancer," whereas "lung excision" is a "treatment method" for this disease. Among these identified relationships, some may be deemed to be desirable because they match with scenarios of the original query. Step 1004 filters out the candidate concepts that do not have the desirable relationship with $c_k$ as scenario-specific concepts. In step 1006, the scenario specific concepts are appended to the original query.

Figure 11:
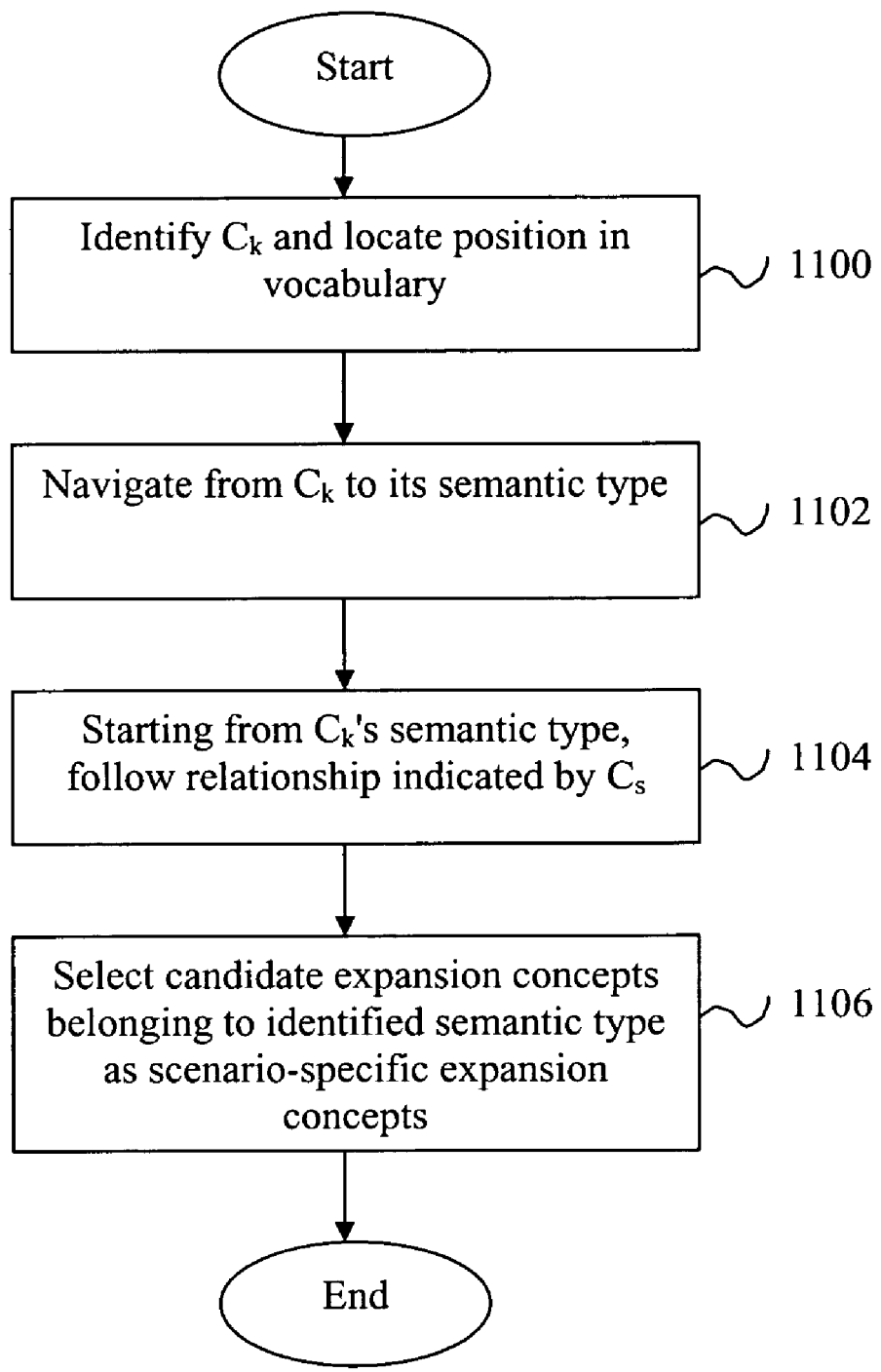
FIG. 11 is a more detailed flow diagram of step 1004 for deriving scenario specific concepts according to one embodiment of the invention.

FIG. 11 is a more detailed flow diagram of step 1004 for deriving scenario specific concepts according to one embodiment of the invention. In step 1100, the process identifies the key concept $c_k$ in the scenario-specific query and locates its position in the controlled vocabulary maintained by the knowledge source 118.

In step 1102, the process navigates from $c_k$ (e.g. "lung cancer") to its semantic type (e.g. "Disease or Syndrome").

In step 1104, the process starts from the $c_k$'s semantic type and traverses through the relationships as indicated by the original scenario concept $c_s$ to reach a set of relevant semantic types. For example, the process may start from the "Disease or Syndrome" semantic type and traverse through the "treats" link if the original $c_s$ is "treatment options," and reach "Therapeutic or Preventive Procedure," "Medical Device," and "Pharmacologic Substance" as the relevant semantic types. In this respect, the scenario concepts that are available for user selection are associated with a particular semantic link in the knowledge base 118. For example, the scenario "treatment options" is associated with the semantic link "treats."

In step 1006, the candidate expansion concepts belonging to the identified semantic types are selected as scenario-specific concepts.

According to one embodiment of the invention, the query expansion module 202 assigns weights to each appended $c_s$ based on how frequently it co-occurs with $c_k$ in a sample corpus. A scenario concept $c_s$ receives a higher weight if it co-occurs with $c_k$ more often. The weights distinguish $c_s$ that are truly semantically related to $c_k$ (since they co-occur more often) from those that are only marginally related. For example, for two "Therapeutic or Preventive Procedure" concepts, "radiotherapy" co-occurs with "lung cancer" more often than "heart surgery." As a result, "radiotherapy" receives a much higher weight than "heart surgery" when appended to the query "lung cancer, treatment."

The expanded query from the query expansion module 202 is then provided to the VSM module 204. The VSM module 204 identifies one or more free-text documents in the documents database 110 that matches the expanded query, and returns the identified documents in order of their extent of the match with the query.

Figure 12:
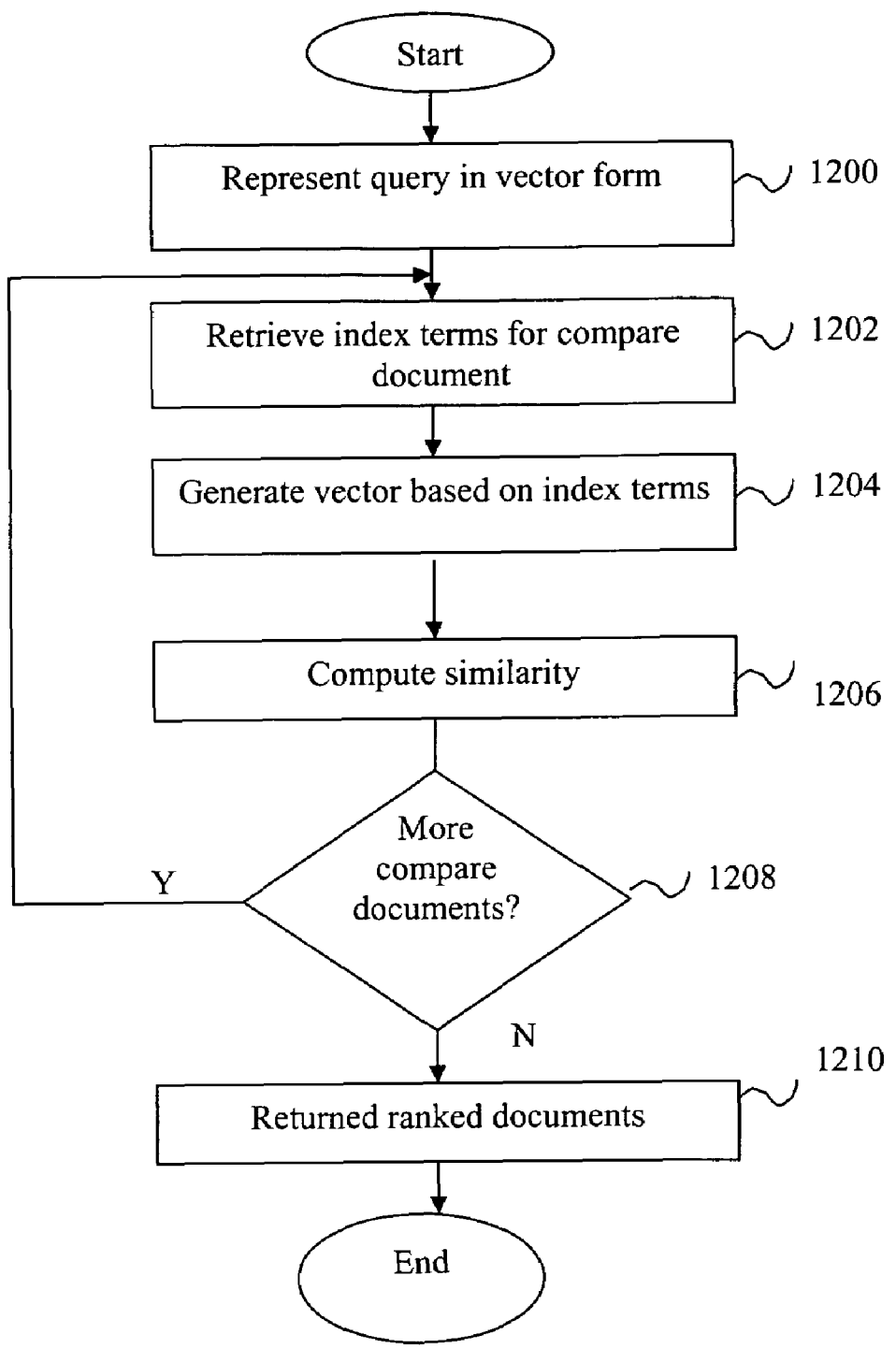
FIG. 12 is a flow diagram of a process of identifying and ranking free-text documents based on an input query according to one embodiment of the invention.

FIG. 12 is a flow diagram of a process of identifying and ranking free-text documents based on an input query according to one embodiment of the invention. In step 1200, the input query is represented by a vector in an n-dimensional space, where n is the number of distinct terms. Each axis in this n-dimensional space corresponds to one term.

In step 1202, the VSM module 204 retrieves index terms for a free-text document that is to be compared against the query. A vector for the compare document is generated in step 1204 based on the index terms.

In step 1206, similarity between the input query and compare document is computed using a metric on their respective vectors. According to one embodiment of the invention, the VSM module 204 computes a cosine of the angle between their corresponding vectors.

In step 1208, a determination is made as to whether there are any more documents to be compared. If the answer is NO, the VSM module 204 returns a ranked list of documents in order of the computed similarity to the input query.

Any one of various well-known vector space models may be used for representing the input query and searched free-text documents via their respective vectors. Such vector space models include stem-based VSM and concept-based VSM. In stem-based VSM, morphological variants of a word like "edema" and "edemas" are conflated into a single word stem, "edem," and the resulting word stems are used as terms to represent the query or document. In concept-based VSM, concepts instead of single words or word stems are used as the vector space basis.

According to one embodiment of the invention, the VSM employs a phrase-based VSM where a query or document is represented as a set of phrases. Each phrase may correspond to one or more concepts, and consist of one or more word stems. For example, "infiltrative small bowel process" is represented by phrases (; "infiltr"), (C0021852; "smal", "bowel"), (; "proces") where C0021852 is a concept identifier and "smal," and "bowel" are word stems contained in the concept.

A phrase is represented by two sets. The first set consists of ordered pairs of the phrase's word stems (s) and their occurrence counts in the phrase ($\pi_{s,p}$). The second set consists of ordered pairs of the phrase's concepts (c) and their occurrence counts ($\pi_{c,p}$). Formally, a phrase (p) is defined as the pair of sets where $p=(\{(s, \pi_{s,p})\} s \in S, \{(c, \pi_{c,p})\} c \in C)$. We denote the set of all phrases by P. Furthermore, we require that there is at least one stem in each phrase, i.e., for each phrase $p \in P$, there exists some stem s such that $\pi_{s,p} \geq 1$. We use a phrase vector $x^p$ to represent a document x, $x^p = \{(p, \tau_{p,x})\} p \in P$, where $\tau_{p,x}$ is the number of times phrase p occurs in document x. And we define the phrase-based inner product as $$\langle x, y \rangle^p = \sum_{p \in P} \sum_{q \in P} \tau_{p,x} \tau_{q,y} s^p(p, q)$$

where we use $s^p(p; q)$ to measure the similarity between phrases p and q. We call $s^p(p; q)$ the phrase similarity between phrases p and q, and define it as $$s^p(p, q) = \max\left(\left(f^s \sum_{s \in S} \iota_s^2 \pi_{s,p} \pi_{s,q}\right), \left(f^c \sum_{c \in C} \sum_{d \in C} \iota_c \pi_{c,p} \iota_d \pi_{d,q} s^c(c, d)\right)\right)$$

where $\iota_s$, $\iota_c$, $\iota_d>0$ are the inverse document frequencies of stem s, concept c, and concept d respectively, and $s^c(c; d)$ is the conceptual similarity between concepts c and d. As in the concept-based VSM, we ignore polysemy and assume each phrase expresses only one concept, $$\pi_{c,p} = \delta_{c,c_p} = \begin{cases} 1 & \text{if } c = c_p \\ 0 & \text{if } c \neq c_p \end{cases}$$

where $c_p$ is the concept that phrase p expresses.

The similarity between two concepts must also be defined. Among the many possible conceptual relations, we concentrate on the is-a relation, also called hyponym relation. A simple example is that "fever" is a hyponym of "body temperature elevation." Hyponym relations are transitive. We derive the similarity between a pair of concepts using their relative position in a hyponym hierarchy. For a pair of ancestor-descendant concepts, c and d, in the hyponym hierarchy, we define their conceptual similarity as $$s^c(c,d) = \frac{1}{l(c,d)\log_2(D(c)+D(d)+1)}$$

where l(c,d) is the number of hops between c and d in the hierarchy, and D(c) and D(d) are the descendant counts of c and d respectively.

Then the phrase similarity is reduced to $$s^P(p,q) = \max\left(\left(f^s \sum_{s \in S} \iota_s^2 \pi_{s,p} \pi_{s,q}\right), \left(f^c \iota_{c_p} \iota_{d_q} s^c(c_p, d_q)\right)\right)$$

where $c_p$ is the concept phrase p expresses, and $d_q$ is the concept q expresses. Here we use two contribution factors, $f^s$ and $f+$, to specify the relative importance of the stem contribution and the concept contribution in the overall phrase similarity. The stem contribution $$f^s \sum_{s \in S} \iota_s^2 \pi_{s,p} \pi_{s,q}$$

measures the stem overlaps between phrases p and q, and the concept contribution $$f^c \iota_{c_p} \iota_{d_q} s^c(c_p, d_q)$$

takes the concept interrelation into consideration. Conceptually, when combining the stem contribution and the concept contribution this way, we use stem overlaps to compensate for the incompleteness of the controlled vocabularies in encoding all necessary concepts, and the incompleteness of the knowledge sources in describing all necessary concept interrelations. Once again, we define the phrase-based document similarity between documents x and y to be the cosine of the angle between their respective phrase vectors, $$sim^P(x,y) = \frac{\langle x,y \rangle^P}{\sqrt{\langle x,x \rangle^P \langle y,y \rangle^P}}$$

While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims and their equivalents.

What is claimed is:

1. A computer system for identifying flee-text documents, the system comprising:
    a knowledge source storing in a knowledge database a plurality of concepts formed based on one or more words from a predefined vocabulary set, the knowledge source maintaining a plurality of relationship links wherein each relationship link defines a relationship between a first semantic grouping of the concepts and a second semantic grouping of the concepts;
    an input receiving an input query including an original query concept and at least one scenario identifier, the at least one scenario identifier being associated with at least one of the relationship links;
    a database of flee-text documents, wherein each document is indexed via one or more indexing concepts formed based on one or more words from the predefined vocabulary set;
    one or more processors coupled to the input, each of the one or more processors being operable to execute one or more computer instructions which:
        generate the indexing concepts for the free-text documents based on the one or more words from the predefined vocabulary set, wherein the program instructions which generate the indexing concepts include computer instructions for:
            maintaining a plurality of data structures mapping each of the plurality of concepts in the knowledge source to all words appearing in the concept;
            receiving a particular one of the free-text documents;
            identifying based on the plurality of data structures the one or more of the plurality of concepts in the knowledge source mapped to a set of words appearing in the particular one of the free-text documents; and
            returning the one or more identified concepts as candidate index concepts for the particular one of the free-text documents;
        automatically generate an expanded input query including both the original query concept and one or more additional query concepts, the one or more additional query concepts being selected from one or more first particular semantic groupings of the concepts in the knowledge source that have a specific relationship link with a second particular semantic grouping of the concepts containing the original query concept, the specific relationship link being identified by the at least one scenario identifier, wherein the computer instructions which automatically generate the expanded input query further include computer instructions which:
            filter candidate expansion concepts not included in the one or more first particular semantic groupings of the concepts in the knowledge source; and
            return the one or more additional query concepts based on the filtering;
        compare the expanded input query with the indexing concepts for the free-text documents; and
        return one or more of the free-text documents that satisfy the expanded input query based on the comparison.

2. The system of claim 1, wherein a sequence of appearance of the words in the particular one of the free-text documents is a free-permutation of the words in the set.

3. The system of claim 1, wherein the processor is further operable to execute computer instructions which filter the candidate index concepts based on a filter selected from a group consisting of symbol type filter, term length filter, coverage filter, subset filter, range filter, and semantic filter.

4. The system of claim 1, wherein the input query includes a plurality of query concepts, and the processor is operable to execute computer instructions which automatically extract a key query concept from the input query and set the extracted key query concept as the original query concept.

5. A method executed by one or more computers for identifying free-text documents, the method comprising:
maintaining a knowledge source storing a plurality of concepts formed based on one or more words in a predefined vocabulary set, the knowledge source maintaining a plurality of relationship links wherein each relationship link defines a relationship between a first semantic grouping of the concepts and a second semantic grouping of the concepts;
generating under control of the one or more computers, indexing concepts for the free-text documents stored in a database, the indexing concepts being generated based on one or more words from the predefined vocabulary set, wherein the generating of the indexing concepts includes:
maintaining a plurality of data structures mapping each of the plurality of concepts in the knowledge source to all words appearing in the concept;
receiving a particular one of the free-text documents;
identifying based on the plurality of data structures, one or more of the plurality of concepts in the knowledge source mapped to a set of words appearing in the particular one of the free-text documents; and
returning the one or more identified concepts as candidate index concepts for the particular one of the free-text documents;
receiving, under control of the one or more computers, an input query including an original query concept and at least one scenario identifier;
automatically generating, under control of the one or more computers, an expanded input query including both the original query concept and one or more additional query concepts, the one or more additional query concepts being selected from one or more first particular semantic groupings of the concepts in the knowledge source that have a specific relationship link with a second particular semantic grouping of the concepts containing the original query concept, the specific relationship link being identified by the at least one scenario identifier, wherein the automatically generating of the expanded input query further includes:
filtering candidate expansion concepts not included in the one or more first particular semantic groupings of the concepts in the knowledge source; and
returning the one or more additional query concepts based on the filtering;
accessing the database of free-text documents;
comparing the expanded input query with the indexing concepts for the free-text documents; and
returning one or more of the free-text documents that satisfy the expanded input query based on the comparison.

6. The method of claim 5 wherein a sequence of appearance of the words in the particular one of the free-text documents is a free-permutation of the words in the set.

7. The method of claim 5 further comprising:
filtering the candidate index concepts based on a filter selected from a group consisting of symbol type filter, term length filter, coverage filter, subset filter, range filter, and semantic filter.

8. The method of claim 5, wherein the input query includes a plurality of query concepts, the method further comprising automatically extracting a key query concept from the input query and set the extracted key query concept as the original query concept.

9. A query expansion method in a system having a knowledge source storing a plurality of concepts formed from a predefined vocabulary set, the knowledge source maintaining a plurality of relationship links wherein each relationship link defines a relationship between a first grouping of the concepts and a second grouping of the concepts, the method comprising:
generating, under control of one or more computers indexing concepts for a plurality of documents configured to be searched based on a search request, wherein the generating of the indexing concepts includes:
maintaining under control of the one or more computers, a plurality of data structures mapping each of the plurality of concepts in the knowledge source to all words appearing in the concept;
receiving, under control of the one or more computers, a particular one of the free-text documents;
identifying based on the plurality of data structures, one or more of the plurality of concepts in the knowledge source mapped to a set of words appearing in the particular one of the free-text documents; and
returning, under control of the one or more computers, the one or more identified concepts as candidates index concepts for the particular one of the free-text documents;
receiving, under control of the one or more computers, an input query having an original query concept and at least one scenario identifier;
generating, under control of the one or more computers, a list of candidate query expansion concepts based on the original query concept;
filtering, under control of the one or more computers, the list of candidate expansion concepts based on the scenario identifier, wherein the filtering includes removing one or more of the candidate expansion concepts from the list if the one or more candidate expansion concepts are not included in one or more first particular groupings of the concepts in the knowledge source that have a specific relationship link with a second particular grouping of the concepts containing the original query concept, the specific relationship link being identified by the at least one scenario identifier; and
generating, under control of the one or more computers, an expanded input query including the original query concept and remaining ones of the candidate expansion concepts.

10. The method of claim 9, wherein the list of candidate query expansion concepts are concepts statistically related to the original query concept.

11. The method of claim 9 further comprising:
assigning a weight to each of the remaining ones of the candidate expansion concepts based on a frequency in which the remaining candidate expansion concept co-occurs with the original query concept in a sample corpus.

12. The system of claim 1, wherein each of the semantic grouping of the concepts is identified by a semantic type.

13. The system of claim 12, wherein the semantic type is a category name.

14. A system for identifying free-text documents, the system comprising:
a knowledge source storing in a knowledge database a plurality of concepts formed based on one or more words in a predefined vocabulary set, the knowledge source maintaining a plurality of relationship links wherein each relationship link defines a relationship between a first semantic grouping of the concepts and a second semantic grouping of the concepts;

a database of free-text documents;

means for generating the indexing concepts for the free-text documents in the database, the indexing concepts being generated based on one or more words from the predefined vocabulary set wherein the means for generating the indexing concepts includes:

a plurality of data structures mapping each of the plurality of concepts in the knowledge source to all words appearing in the concept;

means for receiving a particular one of the free-text documents;

means for identifying based on the plurality of data structures, one or more of the plurality of concepts in the knowledge source mapped to a set of words appearing in the particular one of the free-text documents; and means for returning the one or more identified concepts as candidate index concepts for the particular one of the free-text documents;

means for receiving an input query including an original query concept and at least one scenario identifier;

means for generating an expanded input query including both the original query concept and one or more additional query concepts, wherein the means for generating includes:

means for identifying a specific relationship link in the knowledge source based on the at least one scenario identifier;

means for identifying a first semantic grouping of the concepts containing the original query concept in the knowledge source;

means for identifying a second semantic grouping of the concepts in the knowledge source associated with the first semantic grouping of the concepts via the specific relationship link;

means for filtering candidate expansion concepts not included in the second semantic grouping of the concepts; and means for selecting at least one of the one or more additional query concepts from the second semantic grouping of the concepts based on the filtering;

means for accessing the database of free-text documents;

means for comparing the expanded input query with the indexing concepts for the free-text documents; and means for returning one or more of the free-text documents that satisfy the expanded input query based on the comparison.

15. The system of claim 14, wherein each of the semantic grouping of the concepts is identified by a semantic type.

16. The system of claim 15, wherein the semantic type is a category name.

17. The system of claim 1, wherein the knowledge source is a domain-specific knowledge source, and a concrete domain-specific meaning is assumed for the original query concept.

18. The system of claim 17, wherein the domain is a biomedical domain.

19. The system of claim 18, wherein the computer instructions to automatically generate the expanded input query does not include instructions for word sense disambiguation of the original query concept.

20. The system of claim 1, wherein the specific relationship link identified by the at least one scenario identifier identifies a specific medical task.

21. The system of claim 20, wherein the specific medical task is selected from a group consisting of treatment, diagnosis, prevention, cause, indication, risk factors, prognosis, research, complications, criteria, and preventative health care.

22. The method of claim 9, wherein the knowledge source is a domain specific knowledge source, and a concrete domain-specific meaning is assumed for the original query concept, the method further comprising:

comparing, under control of the computer, the expanded input query with the indexing concepts associated with the plurality of documents; and returning one or more of the documents that satisfy the expanded input query based on the comparison.

* * * * *